Figure 5:
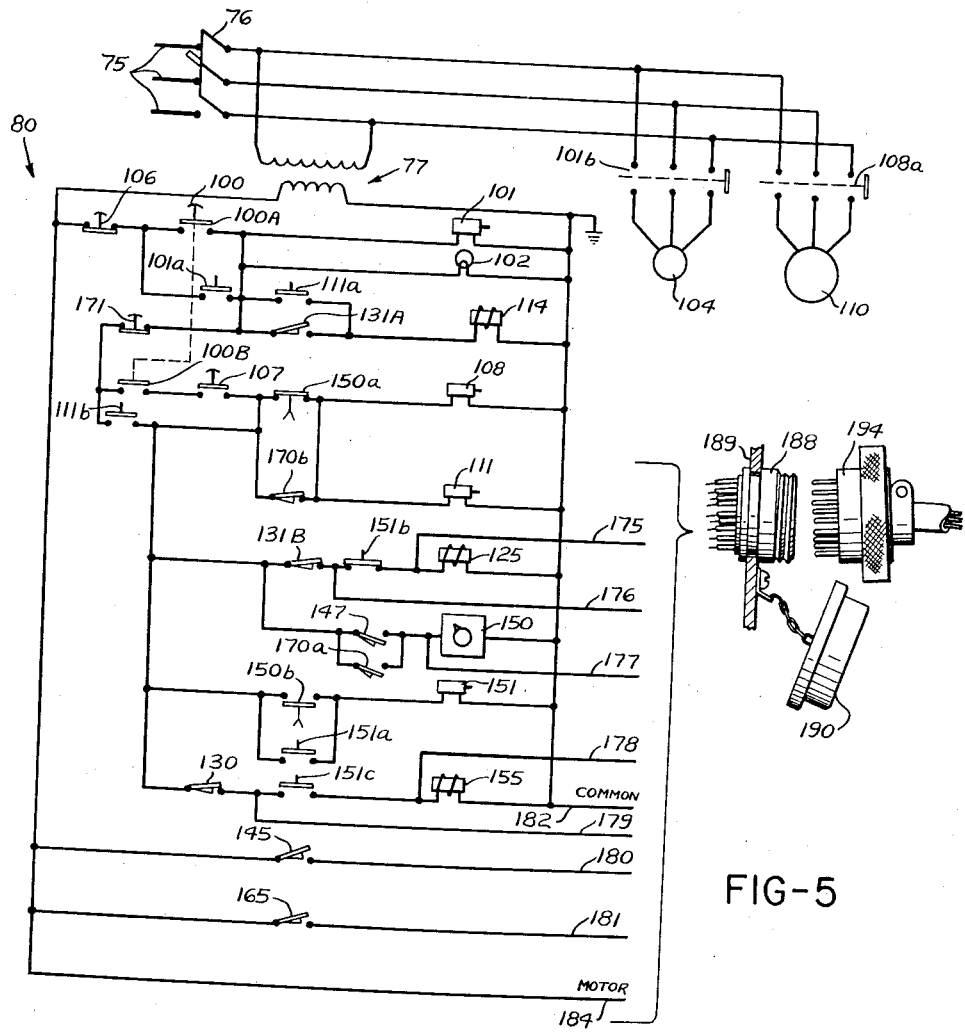

Feb. 14, 1961
W. F. ALLER ET AL
2,971,808
MACHINE CYCLE RECORDING SYSTEM
Filed Sept. 4, 1956
3 Sheets-Sheet 1
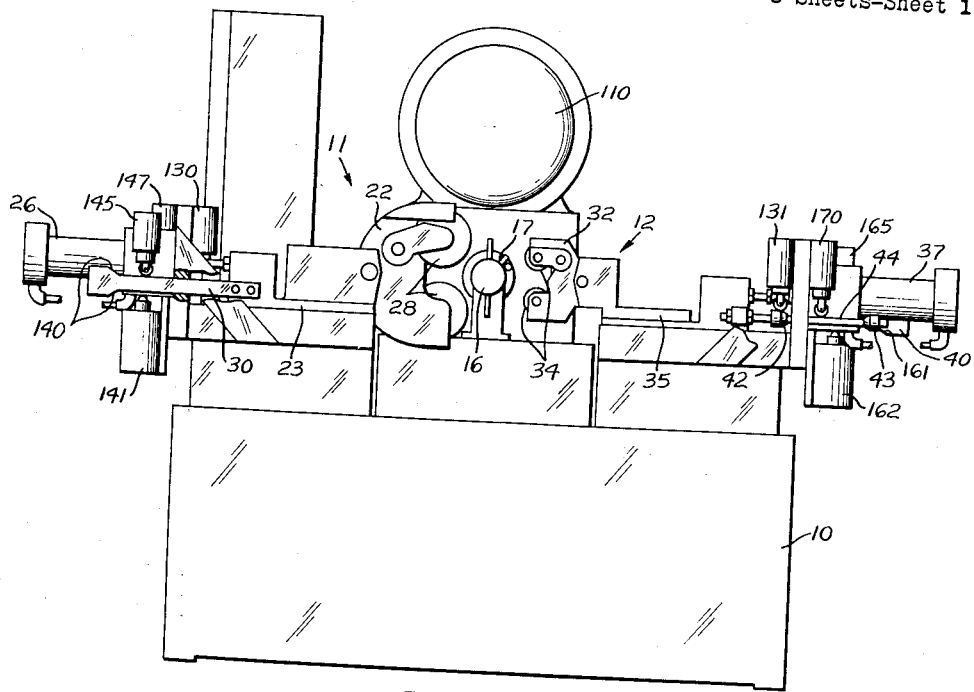
FIG-1
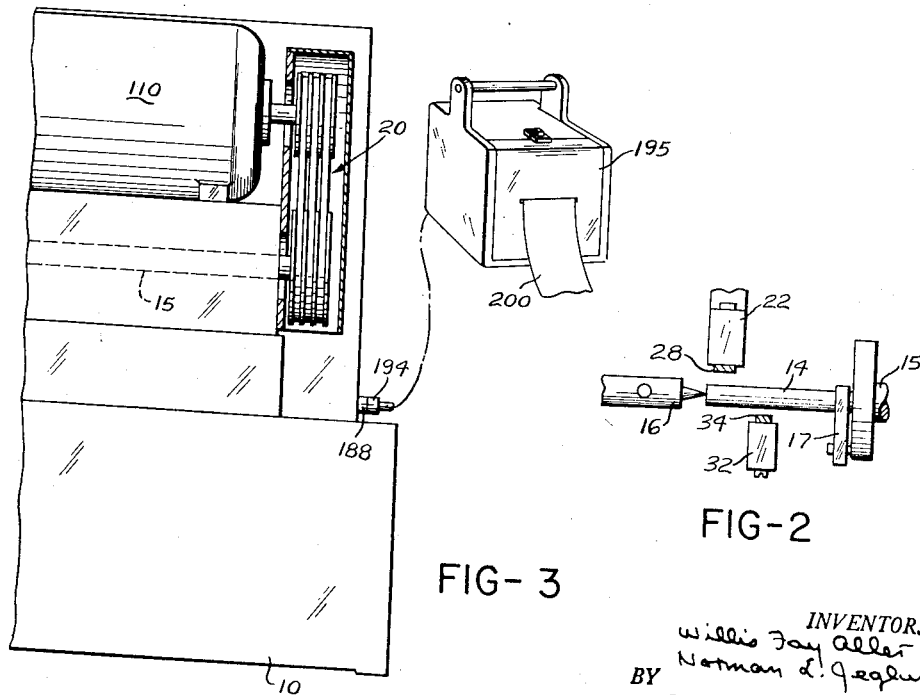
FIG-3
FIG-2
INVENTORS
Willis Fay Aller &
BY Norman L. Jegelum
Edward T. Noegel.
Atty.

Feb. 14, 1961  W. F. ALLER ET AL  2,971,808
MACHINE CYCLE RECORDING SYSTEM
Filed Sept. 4, 1956  3 Sheets-Sheet 2

INVENTORS
Willis Fay Aller &
Norman J. Jeglum
BY Edward J. Noe Jr.
Atty.

United States Patent Office 2,971,808
Patented Feb. 14, 1961

2,971,808

MACHINE CYCLE RECORDING SYSTEM

Willis Fay Aller and Norman L. Jeglum, Dayton, Ohio, assignors, by mesne assignments, to The Sheffield Corporation, a corporation of Delaware Filed Sept. 4, 1956, Ser. No. 607,942

6 Claims. (Cl. 346—33)

This invention relates to electrical systems and particularly to an electric system for monitoring machine operations.

It is an object of this invention to provide an electric system for monitoring the operation of a machine having a sequential operating cycle to determine the duration and relative timing of critical machine operations or movements whereby the relationship of actual to optimum operating conditions can be readily and accurately determined.

It is a further object to provide a monitoring electric system for machine operation, the system providing a common receptacle for quick detachable connection to a recorder for periodic checks of machine operation as desired without interrupting or disturbing machine operation.

It is a further object of this invention to provide an electric system for a machine, the system including a plurality of electric signal sources energized in a predetermined relationship to actuation of machine components, and monitoring leads connected for energization with each of the sources leading to a common connection such as multiple plug receptacle for quick detachable connection to a recorder for recording the timed relation of the signal sources.

It is a further object to provide such a system wherein the signal sources are relays, solenoids, and the like in energizing circuits for automatic control of machine operation, the monitoring leads being connected in parallel to the signal sources whereby a recorder can be readily connected to and disconnected from the system, as by a common multiple prong plug, without breaking the energizing circuits or disturbing continued machine operation.

It is a further object to provide an electric system for a machine, including a plurality of signal circuits, each circuit having a signal source such as a relay, solenoid, or the like and a controlling set of contacts in series therewith, monitoring leads being provided for each of the circuits connected in series to the respective set of contacts and in parallel to the signal source controlled thereby, and a common connection for quickly connecting and disconnecting a recorder for recording machine operation without disturbing machine operation.

It is a further object to provide a machine having such controlling and monitoring electrical systems wherein a multiple plug receptacle is mounted in a readily accessible position on the machine frame and connected to a multiple prong plug of a recorder for recording machine operation.

Figure 4:
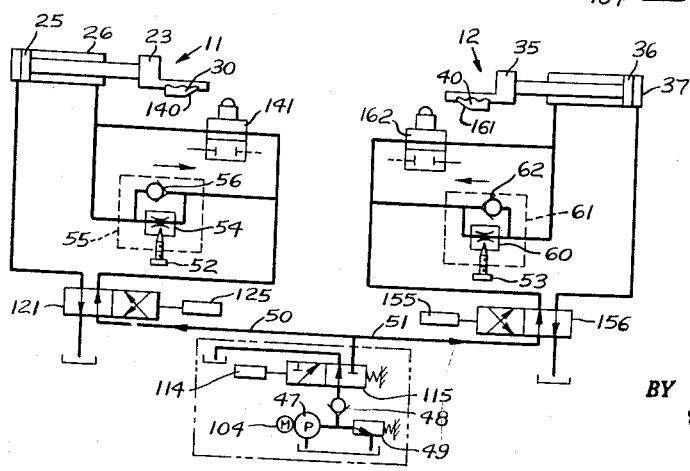
Figure 9:
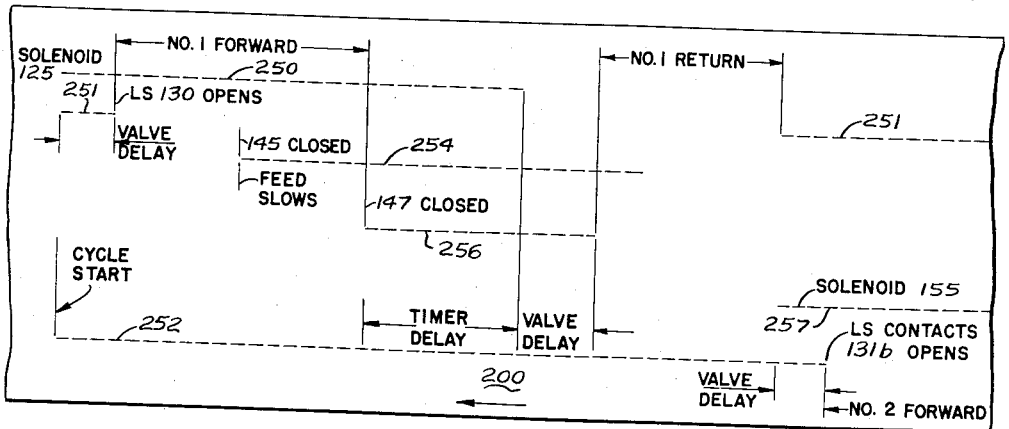
Figure 10:
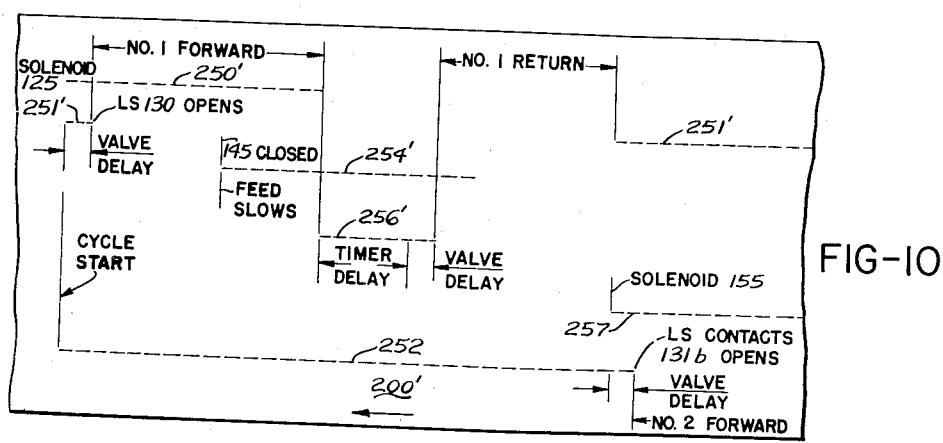
Figure 6:
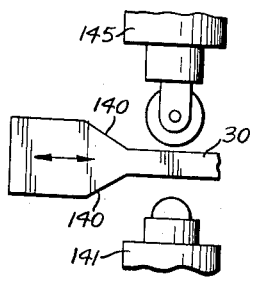
Figure 7:
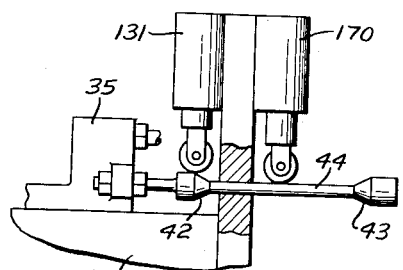
Figure 8:
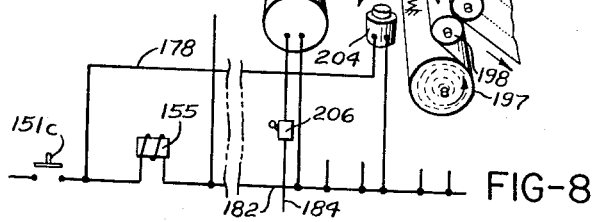

Other objects and advantages of the invention will be apparent from the following description, the appended claims, and the accompanying drawings, in which, Figure 1 is a front view in elevation of a machine embodying the present invention, Figure 2 is a fragmentary plan view of a portion of the machine of Figure 1 showing a workpiece mounted in position, Figure 3 illustrates a portion of the rear of the machine, partially broken away, and a recording device, Figure 4 is a diagram of the hydraulic system, Figure 5 is an electrical circuit diagram, Figures 6 and 7 are fragmentary details of switch and valve actuating structure, Figure 8 includes a portion of the electric circuit and a diagram of a recording device and, Figures 9 and 10 are record strip portions, obtained through application of the present invention, showing an exemplary machine operation before and after timing adjustment, In machines having sequential operating cycles in which machine components are operated either manually or automatically it is important that optimum timing be obtained for minimum time consumption and the most efficient operation. In equipment of high rate production a saving of a few seconds during each operating cycle will result in greatly increased output for a given time period. Through application of the present invention machines of various types, such as transfer devices, automatically operating machine tools, and automatic gaging systems, can be checked accurately without interrupting continued operation to obtain a record showing clearly the timed relationship between operation of the machine components.

In machines having automatic cycles and controlling electric systems, monitoring leads are provided which are energized and deenergized in accordance with the operation of signal sources in the controlling circuits. A common receptacle is provided for quickly connecting the monitoring leads to a recording device for charting the operation of the signal sources and the machine components. Each of the monitoring leads is normally connected in series with a set of switch contacts in a controlling circuit and parallel to any signal source or controlling element such as a relay, solenoid, or the like, controlled by those switch contacts. In some situations specially provided limit or microswitches can be utilized as signal sources to provide a signal of machine operation. Through the system of this invention a number of machines can be quickly monitored in turn by use of a single recorder and without interrupting continued machine operation.

While the present invention is adapted to a variety of applications it has been illustrated as embodied in a machine tool for rolling threads on a workpiece. In this machine a pair of substantially opposed threading rollers are alternatively moved inward into threading engagement with a driven workpiece.

Referring particularly to the drawings Figure 1 illustrates an exemplary machine having a base 10 and opposed threading heads 11 and 12. A workpiece 14 (see Figure 2) mounted between spindle 15 and center 16 is driven by dog 17. Spindle 15 extends back to the rear of the machine and is driven by electric motor 110 through a pulley and V-belt arrangement 20.

Thread rolling head 11 includes a thread roller 22 mounted on slide 23 for movement toward and from the workpiece and actuated hydraulically by a piston 25 in cylinder 26 mounted on base 10. Roller 22 includes opposed helically formed threading rolls 28 adapted to form threads on workpiece 14 at one location therealong when roller 22 is advanced. Slide 23 has a cam plate 30 attached thereto having cam surfaces 140 for simultaneous actuation of a switch 145 and a hydraulic valve unit 141 at a given point as the slide advances (note Figure 6). Slide 23 initially has a fast forward movement and when cam surface 140 strikes the actuating roller of valve unit 141 it goes into a slow advance movement, all as later described more specifically with reference to the hydraulic diagram of Figure 4. Limit switches 130 and 147 are respectively actuated at the rearward and forward positions of slide 23 through cam mechanisms similar to corresponding structure later described in reference to rolling head 12.

Head 12 similarly includes a thread roller 32 having rolls 34 for forming the work. Slide 35 of head 12 is actuated by piston 36 in cylinder 37. This head also has a switch 165 and hydraulic valve unit 162 operated by cam surfaces 161 on cam plate 40 moveable with slide 35. Limit switches 131 and 170 are respectively actuated by cams 42 and 43 on cam rod 44 in the rearward and forward slide positions (note Figure 7).

The thread rollers 22 and 32 have not been illustrated in detail. A particular unit which could be utilized is disclosed in co-pending patent application Ser. No. 402,465, filed January 6, 1954, now Patent No. 2,933,955.

The hydraulic circuit for the actuation of heads 11 and 12 for rolling threads on workpiece 14 is illustrated diagrammatically in Figure 4. Electric motor 104 drives pump 47 to supply hydraulic fluid under pressure to the upper portion of the system through ball check valve 48. Regulator 49 governs the supplied pressure. With all actuating solenoids of the hydraulic systems deenergized and the valves in the positions as shown, unloading valve 115 returns fluid directly to the tank, relieving pump 47. Upon energization of solenoid 114, valve 115 is shifted and the fluid under pressure is conducted through lines 50 and 51 to the circuit portions for heads 11 and 12 respectively. The entire operation is electrically controlled as will be later described in detail. Simultaneously with energization of solenoid 114, solenoid 125 is also energized to shift valve 121 to supply pressure to the rear of piston 25, moving slide 23 forward. Solenoid 155 remains deenergized and pressure is conducted through valve unit 162 to the forward portion of cylinder 37 holding piston 36 in its rearward position.

During the forward movement of slide 23 hydraulic fluid is exhausted from the forward portion of cylinder 26 through valve unit 141 and returned to the tank. When cam surface 140 strikes the actuator of valve unit 141 flow through this unit is terminated and the only path for the fluid to escape from cylinder 26 is through restriction 54 of flow control valve 55. Check valve 56 of this unit allows free flow in the opposite direction when slide 11 is returned. Thus slide 23 starts forward initially with a fast movement and its speed is reduced when valve 141 is actuated to restrict flow from the forward portion of cylinder 26.

In the forward position of slide 23 switch unit 147 is actuated and roller 22 dwells for a predetermined time in accordance with the setting of a timer 150 included in the electric circuit of Figure 5. Slide 23 then retracts rapidly upon deenergization of solenoid 125.

When slide 23 of head 11 reaches its rearward position, switch 130 is actuated and solenoid 155 is energized to shift valve 156, furnishing fluid to the rear end of cylinder 37 to move piston 36 and slide 35 forward. During the initial forward stroke fluid escapes freely from the forward end of cylinder 37 through valve unit 162. At a predetermined point cam surface 161 actuates valve unit 162, exhaust flow is metered through restriction 60 of flow control valve 61 and the forward movement slows. Check valve 62 allows free flow in the opposite direction upon return. Thus slide 35 and its associated hydraulic system is operated in a manner similar to that of slide 23. After a predetermined delay, solenoid 155 is deenergized, valve 156 once again assumes the position as illustrated and slide 35 is returned. Upon return of slide 35 limit switch 131 is actuated, solenoid 114 is deenergized and valve 115 shifted to unload the hydraulic system.

Adjustable needle valves 52 and 53 vary restrictions 54 and 60 respectively to provide control of the reduced forward speed of the respective heads.

In view of the preceding description of the mechanical components of the exemplary illustrated machine and its associated hydraulic system it is thought that the following description of the electric circuit of Figure 5 is in order.

Power is supplied through main line leads 75 and main control switch 76. The controlling electric system 80 is at one side of transformer 77. Hydraulic motor 104 and spindle 110 receive power directly from the main line leads. The controlling electric system includes a plurality of signal circuits providing electric signal sources for actuation of the components of the machine in a predetermined timed relationship. While the majority of the signal sources are normal components of the controlling system for the automatic cycle, switches 145 and 165, for example, have been added in order to signal the actuation of valve units 141, 162 and the change in forward speed of the respective slides.

Initially Master Start switch 100 is depressed, closing contacts 100A and 100B. Relay 101 is energized and light 102 is illuminated to signal that hydraulic pump motor 104 is energized. Energization of relay 101 closes contacts 101a in a holding circuit and 101b to energize motor 104. Push button switch 106 acts as a Master Stop. Simultaneous depression of Master Start switch 100 and Cycle Start switch 107 energizes relay 108. Contacts 108a close in the circuit to spindle motor 110 starting workpiece 14 into rotation. Cycle relay 111 is energized. Contacts 111a close and solenoid 114 is energized to actuate valve 115 and supply hydraulic pressure to the actuating portions of the hydraulic system. Energization of relay 111 also closes contacts 111b to energize solenoid 125, shift valve 121, and start head 11 forward.

As head 11 starts forward the contacts of limit switch 130 open. Since limit switch 131 is still engaged by cam 42 of head 12, contacts 131a remain open and 131b remain closed. At a predetermined point in the forward movement of head 11 valve 141 is actuated by cam surface 140 as previously described and the rate of forward movement slows. Simultaneously with the change in speed switch 145 is actuated and closed.

When head 11 reaches its forward position limit switch contacts 147 are closed to timer 150. After a predetermined time delay contacts 150a open and 150b close. Relay 151 is then energized to close contacts 151a, c and open contacts 151b. Contacts 151a close in a holding circuit and the opening of contacts 151b deenergizes solenoid 125 to allow its return shift and head 11 starts its return movement. When head 11 starts its return movement limit switch contacts 147 open to timer 150.

When head 11 reaches its return position contacts 130 are closed to energize solenoid 155, actuate valve 156, and start head 12 forward. As head 12 starts forward limit switch 131 is actuated. Contacts 131A then close and contacts 131B open to solenoid 125.

Actuation of valve 162 slows the forward speed of head 12 and switch 165 closes to signal this transition.

At its forward position head 12, through cam 43, engages the follower of limit switch 170 to close contacts 170a, energizing timer 150. After a predetermined delay timer contacts 150a open and 150b close. Relay 151 is energized. Contacts 151a are closed in a holding circuit; contacts 151b open to solenoid 125, and contacts 151c close. Opening of contacts 170b deenergizes cycle relay 111 to stop spindle motor 110. It also results in deenergization of solenoid 155 and head 12 starts its rapid return.

When head 12 reaches its rearward position contacts 131a are opened to deenergize solenoid 114 and unload the hydraulic system, completing the cycle. Push button 171 acts as a Master Retract to retract the heads whenever desired.

It will be noted in the controlling system of Figure 5 that the various switch contacts, whether limit, relay, or timer actuated, are to the left of the loads or signal sources which they control. Common signal sources in such systems are solenoids, relay coils, timer coils and motor windings. Thus the loads are on a common side of their controlling contacts and on the ground side of the system.

The present invention provides a unique monitoring system for use in recording the actuation of critical signal sources in such controlling systems to determine the timed interrelationship of machine operation. In this instance monitoring leads 175 to 181 are provided along with a common lead 182 and a lead 184 for the motor of a recorder. These monitoring leads are connected to a common receptacle 188 mounted on a portion 189 of the machine frame in a readily accessible position. A cover 190 is provided for threading over receptacle 188 when it is not being utilized.

It will be noted that monitoring leads 175 and 177, as examples, are connected in series to controlling contacts and in parallel to the signal sources (solenoid 125 and timer 150 respectively) whose energization and deenergization correspondingly affects the respective monitoring leads. In the case of switches 145 and 165, as examples, the monitoring leads 180 and 181 lead directly from the switch contacts.

Receptacle 188 is adapted to receive the multiple prong plug 194 of a recorder such as that indicated at 195. While any suitable recorder can be utilized, a recorder particularly adapted for this type operation is illustrated and described in detail in patent application Ser. No. 607,953, filed September 4, 1956.

A schematic diagram of a portion of such a recorder is shown in Figure 8. A roll of suitable paper such as a commercially available pressure sensitive type is mounted at 197. The strip is threaded over a driving roll 198 driven by motor 199 and chain 196. It passes between driving roll 198 and loading roll 199. Strip 200 then appears through the forward housing of recorder 195. A marking stylus such as that indicated at 202 is provided for each monitoring lead or channel and controlled by solenoid 204. In this example the solenoid 204 for monitoring lead 178 is illustrated and similar solenoids would be provided for the other monitoring circuits with associated stylii spaced across the strip. Common lead 182 is connected to each of the stylus operating solenoids and a switch 206 controls operation of motor 199. Thus when plug 194 is inserted into receptacle 188 the stylus actuating solenoids 204 are connected to the monitoring leads 175 and 181. Similarly common lead 182 and motor lead 184 are connected into the recorder circuits. Because the monitoring leads are in series with controlling contacts of the controlling electric system and in parallel to any loads controlled thereby the circuits of the controlling electric system will not be broken and the machine operation can continue uninterrupted.

Figure 9 illustrates a portion of a record strip 200 obtained for the illustrated machine. The dotted horizontal lines are those impressed on the record strip 200 by the respective marking stylus 202. When the cycle is initiated solenoid 125, limit switch 130, and limit switch contacts 131B are energized along with their respective monitoring leads and lines 250, 251, and 252 are commenced. After a delay for valve shift time line 251 stops as limit switch 130 is opened and head 11 starts forward. Actuation of switch 145 starts line 254 indicating that the forward speed has slowed. Closing of forward limit switch 147 starts line 256 indicating that head 11 has reached its forward position and that the timed delay has commenced. After timer 150 times out there is a delay for valve shifting and the terminating point of line 256 indicates that switch 147 has again opened and head 11 has started its return stroke. Line 254 terminates when switch 145 is released on the return movement of head 11. When head 11 reaches its returned position line 251 commences again when limit switch 130 is closed and simultaneously solenoid 155 (line 257) for the forward movement of head 12 is energized. After valve shift and roll off delay contacts 131B of limit switch 131 open, terminating line 252 and indicating that head 12 has started forward. The portion of the timing chart relating to further movements of head 12 have been omitted as being a substantial duplicate of that for head 11. It will be seen that a full and accurate presentation of the timed interrelationship of the various signal sources and machine operations is thus provided.

The strip portion 200' of Figure 10 is a timing chart obtained after various machine adjustments have been made to correct timing deficiencies revealed by chart 200 of Figure 9. It will be noted that there has been a substantial saving in cycle time because wasted time intervals are clearly revealed by the chart 200 previously obtained. Record lines on strip 200' have been indicated by the same numerals as in strip 200 of Figure 9 but with prime additions. As examples of time savings it is noted that binding in the various valve mechanisms has been reduced and that the valve shift and roll off delays have been made correspondingly smaller. Further, through adjustment of restrictions 52 and 53 in flow control valve units 55 and 61 respectively the forward feed interval at reduced speed has been reduced. Also an examination of the chart of Figure 9 reveals that the timer delay was excessively long and this too was reduced.

The discussion of charts of Figures 9 and 10 is intended to illustrate the full presentation available through application of the present invention and the many possible advantages flowing therefrom.

Thus it is seen that a machine and system have been provided whereby the timing of various machine components can be accurately and rapidly obtained without interrupting machine operation. Through the present invention a number of machines can be monitored as desired through the provision of receiving receptacles and utilization of a common recorder. Errors in timing and wasted time operations are clearly revealed and timing can be quickly adjusted to correct the disclosed deficiencies.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. In a machine having an automatic sequential operating cycle, a controlling electrical system having electric signal sources in signal circuits for automatic actuation of machine components in a predetermined cycle, a monitoring electric system having leads connected in parallel to signal sources in each of said signal circuits for energization or deenergization with the signal sources, whereby said leads are automatically energized in relation to machine operation, and a common connection for said leads for simultaneous quick connection to and disconnection from a recorder for recording the relationship of the signals provided and the timed relationship of the actuation of the machine components, the circuits through said leads all being broken when the recorder is disconnected, whereby such connection for recording can be made without breaking the signal circuits or disturbing continued machine operation.

2. An automatic machine having a sequential operating cycle, comprising an electric system including electrical signal sources automatically energized in a predetermined relationship to determine the operating cycle, actuating means in said machine responsive to said signal sources and connected for actuation of machine components in a cyclic manner, a monitoring electric system including a plurality of leads, said leads including one connected for energization with each of said signal sources and supply leads for energization of a recorder motor, a multiple prong receptacle permanently connected to the plurality of leads and adapted to receive a multiple prong male plug connected to a motor driven multiple channel recorder for recording the timed relationship of the signal sources, means mounting said multiple plug receptacle in an accessible position on a portion of the machine frame, the circuits including said signal sources being undisturbed upon connection and disconnection of said recorder, whereby said plug can be quickly connected and disconnected for recording operations as desired without disturbing continued machine operation.

3. In a machine having a number of different operable components movable in a variable timed relation with one another, a controlling electric system having a plurality of electric circuits for control of machine operation, each circuit having a signal source for actuation of a machine component and a controlling set of contacts in series therewith, actuating means in said machine responsive to each of said signal sources and connected for mechanical actuation of a machine component, a monitoring electric system having a plurality of leads, one connected in series to each set of controlling contacts for energization in a predetermined relationship to actuation of machine components, and a multiple channel recorder having individual recording devices each operatively connected to one of said leads for recording on a common moving record sheet the timed relationship of the signal sources and of mechanical operation of the machine.

4. In a machine tool or the like having an automatic repetitive operating cycle, a controlling electric system having a plurality of electric circuits for control of machine operation to determine the operating cycle thereof, actuating means in said machine, machine components, and means connecting said components to said actuating means for movement thereby, each of said circuits having an electrically energized controlling element for controlling the respective actuating means and a controlling set of contacts in series with the controlling element, a monitoring electrical system having leads connected in series to each set of said controlling contacts and in parallel to the respective controlling element, whereby said leads are automatically energized in relation to actuation of the machine components, a common connecting means for said monitoring leads including a multiple lead connecting unit connected to all said leads, a multiple channel recorder having a mating connecting unit for simultaneous quick connection and disconnection of each of said leads to a respective channel of the recorder for recording the timed relationship of actuation of machine components, the signal circuits of said controlling electrical system being undisturbed upon connection and disconnection of said recorder, whereby the operating cycle can be recorded without disturbing continued machine operation and a single recorder can be readily used with a number of machines.

5. The apparatus as set forth in claim 4 in which the controlling electric system has its controlling elements on a common side of the respective electric circuits and controlling contacts, the monitoring leads being connected to the common side of the contacts and including a lead from the common side of the system.

6. The apparatus as set forth in claim 4 in which the leads of the monitoring electrical system include supply leads connected to said multiple lead connecting unit for energization of a recorder motor, said recorder including an electric chart drive motor, and the mating connecting unit of the recorder including means for simultaneous quick connection and disconnection of both the leads of said monitoring system and said supply leads.

References Cited in the file of this patent

UNITED STATES PATENTS

| | | |
|---|---|---|
| 668,426 | Suren | Feb. 19, 1901 |
| 1,244,634 | Neff et al. | Oct. 30, 1917 |
| 1,519,633 | Schirmer | Dec. 16, 1924 |
| 2,325,451 | Wait | July 27, 1943 |
| 2,387,563 | Chapple | Oct. 23, 1945 |
| 2,612,430 | Heide et al. | Sept. 30, 1952 |

FOREIGN PATENTS

| | | |
|---|---|---|
| 3,412 | Great Britain | 1899 |
| 292,225 | Great Britain | June 14, 1928 |
| 490,642 | Great Britain | Aug. 18, 1938 |
| 120,630 | Sweden | Jan. 13, 1948 |